May 9, 1950 A. ROSE 2,506,742

STORAGE TUBE AND TARGET THEREFOR

Filed June 14, 1947

INVENTOR.
Albert Rose
BY
William A. Zalesak
ATTORNEY.

Patented May 9, 1950 2,506,742

UNITED STATES PATENT OFFICE 2,506,742

STORAGE TUBE AND TARGET THEREFOR

Albert Rose, Princeton, N. J., assignor to Radio Corporation of America, a corporation of Delaware Application June 14, 1947, Serial No. 754,633

5 Claims. (Cl. 250—153)

For many purposes it is desirable to record signal information at some arbitrary time and in some arbitrary order at a later time to reproduce copies of such information either in the same or a different order. The present known Teleran radar system is one example of this. Recording on photographic film is an example, which is substantially manual, of a method of accomplishing this result. A picture once photographed and developed may be reproduced many times and, if desired, in piecemeal and in any order of the various parts of the recorded information. Photography, however, is slow compared with possible methods utilizing electronic devices. The usual storage type of television pick-up tube is an example of an electronic device satisfying all the conditions enumerated except one: that of reproducing many copies of the recorded information. The usual pick-up tube is designed to reproduce only one copy as the pick-up target of the cathode ray beam is "wiped" clean by one scansion so as to be ready for recording new information.

It is an object of this invention to so modify a television pick-up tube that a single scansion can remove only a fraction of the information recorded on the target with removal of further fractions which are substantial duplicates of the original information until all of the information is removed.

Another object of the invention is to correlate the parts of the tube and their operations in such a way that each of the repeated scansions of the target will produce a faithful reproduction of the information.

Other objects of the invention will appear in the following specification, reference being had to the drawing in which.

Figures 1, 2, 3:
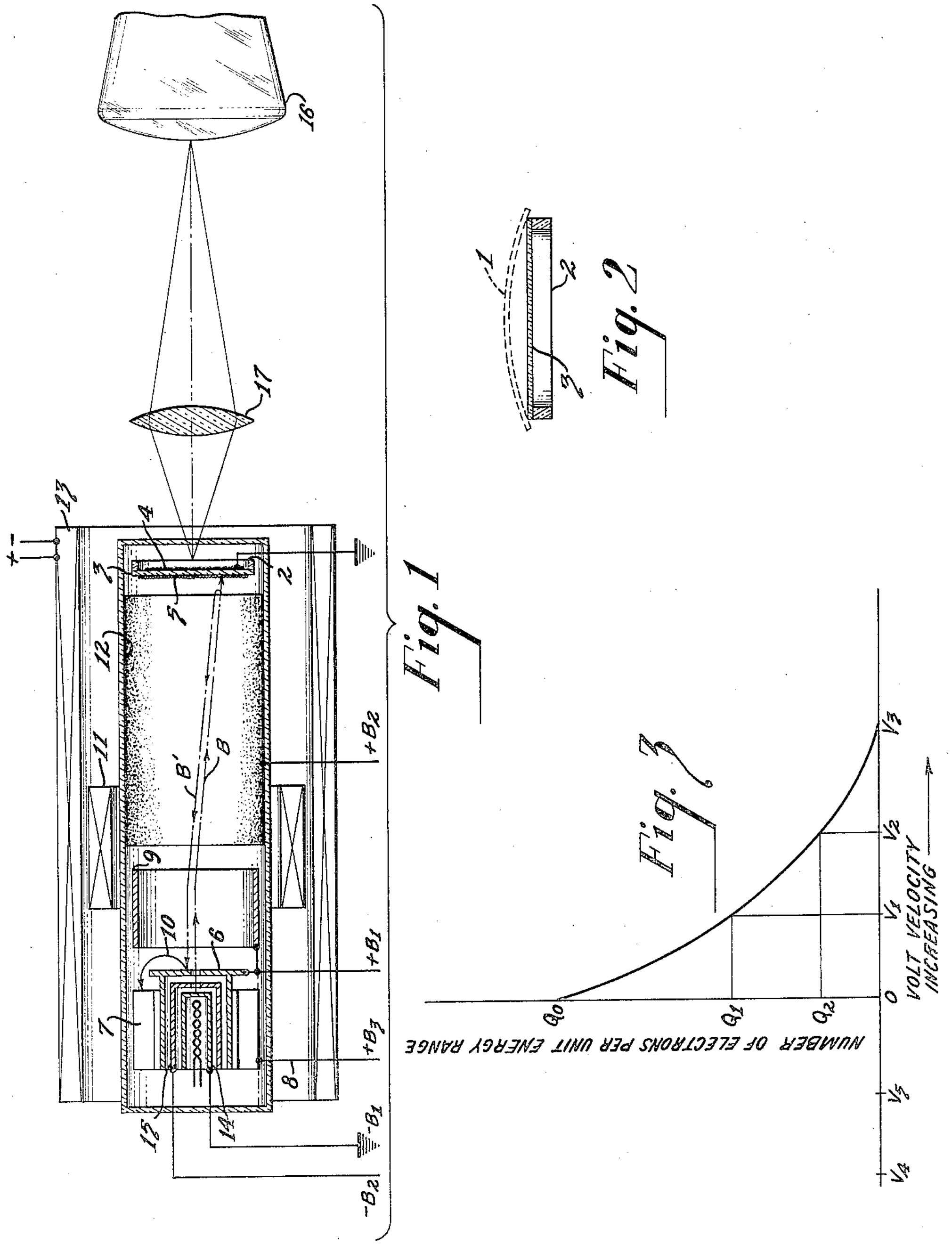
Fig. 1 is an axial section of a cathode ray beam tube illustrating the principles of the invention.
Fig. 2 is a detail illustration of one form of the target.
Fig. 3 is a graph illustrating the principles of the invention.

In a television pick-up tube the scanning beam either in itself or by its effects at the target provides an equivalent resistance path over which the charge on the target leaks off. This equivalent resistance R and the capacitance C of the target, that is, the capacitance between the charged surface and the signal plate, determine the time constant RC of the system.

In the usual storage type television pick-up tube the time constant $T=RC$ is made approximately equal to the frame time, that is, the time of one scansion. In my invention the tube is so designed that the time constant T is equal to many frame times. This may be done either by increasing the equivalent resistance R or the capacitance C or both. The particular requirements and design of the tube dictate which of these parameters is increased and in what manner.

For example, in the orthicon pick-up tube in which the electrons of the beam landing on the target have substantially zero electron velocity, the equivalent resistance R can be increased by decreasing the beam current. This, however, will be found unsatisfactory for two reasons. First, the amount of charge an orthicon target can store for a reasonably small potential swing, required for good resolution, is not sufficient for a number of separate reproductions. Second, the majority of the reproductions will not be faithful to the original reproduction but will be a black and white approximation, lacking the half-tones of the original. This latter arises from the fact that the potential swing on the target is large compared with the velocity range of the electrons emitted by the thermionic cathode. Under these conditions all the beam electrons land on both gray and white charged areas of the target. Hence, a signal from a "gray" area is the same as the signal from a white area.

I have succeeded in obtaining the desired result by use of a special target in which the capacitance C is so high that large amounts of charge may be stored at relatively small potential. The voltage produced by the charge is $$V=\frac{Q}{C}$$

and it will thus be clear that the potential swing may be kept low with this capacity increase. In this way I am able to confine the potential swings of the target areas to such low values that the potentials are much less than the velocity range of the beam electrons which causes the electrons to land in proportion to the charges. This differentiates the "grays" from the "whites."

Particular values of parameters may be computed as follows:

A low velocity scanning beam such as used in the orthicon has an equivalent resistance given approximately by:

$$R=\frac{0.1}{I}\text{ ohms} \quad (1)$$

where I is the beam current in amperes landing on the target.

The target capacitance is given approximately by:

$$C=\frac{Ak}{4\pi d}\times 10^{-12}\text{ farads} \quad (2)$$

where

A is area in square centimeters of the target
$k$ is the dielectric constant of the target and
$d$ is the thickness of the target in centimeters.

To obtain one hundred reproductions of the information stored in the target with a frame time of 1/30 of a second the time constant must be:

$$T=RC=\frac{100}{30}\div 3 \text{ seconds} \quad (3)$$

Assuming a beam signal current I of $10^{-8}$ amperes, a value of 5 for $k$ and 20 cm.$^2$ for A the thickness of the target is found by substituting these values and those of (1) in (3) thus:

$$\frac{0.1}{10^{-8}}\times\frac{20\times5}{4\pi d}\times10^{-12}=3$$

from which:

$$d=3\times10^{-5} \text{ cms.}$$

This is about one one-hundredth of the thickness of the target of the usual orthicon pick-up tube for normal television purposes. One may obtain a target of this order of thinness, for example, by cutting a section from a bubble blown from molten glass as disclosed in my application filed November 28, 1945, Serial No. 631,441, except that a glass of higher resistivity should preferably be used such as G705BA glass of the Corning Glass Co.

I take a section 1 of the film from a glass bubble having the required area and mount it on a glass ring 2 of uranium glass (Fig. 2) by heating the ring and film until the glass film fuses to the ring and becomes sufficiently plastic to stretch taught thereacross by surface tension as at 3. The ring and attached film is then cooled to room temperature. Fig. 2 is, of course, not drawn to scale, the film thickness being greatly exaggerated.

The glass used to produce the bubble from which the thin film, section 1, is cut to make the target 3 should have a resistance ranging from $10^{12}$ to $10^{15}$ ohms per cubic centimeter which would comprise not only G705BA glass but also G705B, G707DG, G790H, G720GO, G750AH, G790J and various other glasses.

The target glass 3 after being mounted in the frame or ring 2 is coated with a conducting transparent film 4 in known ways (Figs. 1 and 3). It is then mounted in the tube envelope, evacuated and treated in the usual known manner to form the photocathode mosaic 5. This may be of the caesiated silver-silver oxide form but any other suitable mosaic may be used.

A target made in the manner described above will have the desired order of thinness. For such a target, the capacity between the photomosaic cathode 5 and the conductive film 4 may be approximated as follows from the data given above:

The time factor RC is given as 3.

From Equation 1, $$R\approx\frac{0.1}{I} \text{ ohms}$$

and where $I\approx10^{-8}$ amperes, $$R\approx10^{-7}$$

then $$C\approx3\times10^{-7} \text{ farads}$$

or $$C\approx300{,}000\ \mu\mu\text{farads}$$

This order of capacity can be compared with the 2,000 $\mu\mu$farad capacity of a mica target in the usual orthicon pickup tube used for normal television purposes. Such a mica target has a thickness in the order of 3 to $5\times10^{-3}$ centimeters.

It is desirable to use electron multiplication of the signal and for this purpose I prefer the multiplier type disclosed in the application of Paul K. Weimer, filed Sept. 16, 1944, Serial No. 554,494, now U. S. Patent No. 2,433,941, issued January 6, 1948, in which the end of the first anode 6 constitutes the first dynode. A plurality of additional dynodes are arranged in succession around the first anode generally indicated by the block diagram 7. The output terminal of the multiplier is shown at 8, the intermediate voltage terminals of the multiplier not being shown.

Reference is made to that application for the details of the multiplier. An anode ring 9 known as the "persuader" has the same applied positive voltage as the anode but it may vary somewhat in some cases. This electrode aids in producing a field that directs the secondary electrons into the second dynode of multiplier stages 7 as indicated at 10. Either the well known electrostatic or electromagnetic deflecting means may be used, electromagnetic being shown at 11 comprising coils that produce fields at right angles to each other and to the axis of the tube. These coils would be connected to the usual saw-tooth or other variable voltage sources of line and frame frequency, not shown. A wall coating anode 12 or equivalent is positioned between the persuader and the target bearing the photocathode 5. Either the well known electrostatic or magnetic means may be used to focus the beam B on the target and the return beam B′ on the first anode 6. I have shown a direct current solenoid coil 13 by way of example for producing a magnetic focusing field.

The signal plate 4 and the cathode 14 will be connected to the minus terminal $-B_1$ of the voltage supply and the grid 15 would be connected to a somewhat more negative terminal $-B_2$. The voltage applied to the various electrodes as well known to those skilled in the art and the positive and negative terminals are designated by reference characters + or − B with subscript numerals to indicate that the potentials may be different. Suitable potentials for these electrodes are given in said Weimer application.

In the operation the teleran or other suitable signals produce a bright fluorescent flash of very brief period and a less bright decaying phosphorescence on the phosphor of the receiving scope 16. When this is observed directly in the radar scope the bright flash has little utility as an indication because it is of such brief duration. To spread the effect out over a sufficiently long period and to store the signals for reproduction at any later time the light from the scope 16 is focused on the photocathode mosaic as indicated by lens 17. Due to the extreme thinness of the target such as $3\times10^{-5}$ cms. calculated above, a charge is produced on the target that is removed only by repeated scansions. For each scansion the electrons land in sufficient quantity to reduce the charge 1/100 of the total charge, the beam current I being shown to have this value. This modulates the beam B′ which bombards electrons from the first dynode 6 and the secondary electrons are attracted into the second stage of the multiplier shown in block diagram at 7. Secondary electrons are bombarded from the various stages thereof (not shown) in succession as explained in said Weimer application so that a greatly multiplied signal may be taken off the output lead 8 and additionally amplified if desired, but this is not shown.

The operation may be explained as follows:

Referring to Fig. 3 the energy distribution of beam electrons emitted from the cathode 14 of Fig. 1 is indicated by the graph. With no light on the target, beam electrons will land until the insulation target drops to substantially $V_3$ volts belows the potential of cathode 14 from which they came. Now, if a photoimage is formed on the target from the scope 16 photoelectrons will be emitted and a charge image will be formed thereon which establishes a potential pattern thereover. When the beam is directed at "black" areas, substantially no electrons will land, the potential being around $V_3$. When the beam reaches "gray" areas, having a positive potential $V_2$, electrons with velocities above $V_2$, that is, velocities $V_2$ to $V_3$, will land and after many scansions bring these areas down to $V_3$. When the beam is over "white" areas having a positive potential of $V_1$ volts, all electrons having velocities above $V_1$, that is, velocities $V_1$ to $V_3$, will land and after many scansions bring the potentials to $V_3$. The number of electrons landing for "gray" areas is the summation of the ordinate values from O to $Q_2$ and the number for "white" areas is the summation of the ordinate values from O to $Q_1$. Thus, the return beam that goes into the multipliers is correctly modulated by the photoimage produced by the light coming from the radar scope 16. In making this image the bright fluorescent flashes are utilized in producing the charge image.

If one were to use the ordinary low capacity target and attempt to reduce the beam current to increase the time constant, that is, increase R instead of C in the time constant RC, the potential swing would have been greater than the velocity range, say $V_5$ for "gray" areas and $V_4$ for "white" areas. The number of electrons landing on "gray" areas would then be the same as those landing on "white" areas, being the summation from O to $Q_0$ in each case. Thus, only a black and white picture could be produced with no intermediate shades.

Instead of a glass film target other forms may be used such as the precipitated silica layer disclosed in the application of Stanley F. Forgue, filed December 16, 1946, Ser. No. 754,715.

Various modifications may be made in the improvement without departing from the spirit of the invention.

What I claim as new is:

1. A cathode ray pickup target comprising a transparent dielectric film having a thickness of the order of $3 \times 10^{-5}$ centimeters, a transparent conducting coating on one side of said film and a photosensitive mosaic on the other side thereof.

2. A cathode ray pickup target comprising a film of glass having a resistivity of $10^{12}$ to $10^{15}$ ohms per cubic centimeter and a thickness of the order of $3 \times 10^{-5}$ centimeters, a transparent conducting coating on one side of said film and a photosensitive mosaic on the other side thereof.

3. A cathode ray pickup target comprising a frame, a film of glass extending across said frame and attached thereto, said glass having a resistivity of the $10^{12}$ to $10^{15}$ ohms per cubic centimeter and the film being of the order of $3 \times 10^{-5}$ centimeters thick, a transparent conducting coating on one side of said film and a photosensitive mosaic on the other side thereof.

4. An electron discharge device comprising, an electron gun structure including a cathode electrode for producing a beam of electrons along a path, a target electrode including a thin dielectric sheet positioned transversely to said beam path, a photosensitive mosaic on the surface of said dielectric sheet facing said electron gun and a conductive film on the other surface of said dielectric target sheet, conductive means for providing said cathode electrode and said conductive film with a common potential, said dielectric film having a thickness in the order of $3 \times 10^{-5}$ centimeters whereby changes in potential of said mosaic relative to said conductive film are less than the normal velocity range of said electron beam.

5. An electron discharge device comprising, an electron gun structure including a cathode electrode for producing a beam of electrons along a path, a target electrode including a thin dielectric sheet positioned transversely to said beam path, a photosensitive mosaic on the surface of said dielectric sheet facing said electron gun and a conductive film on the other surface of said dielectric target sheet, conductive means for providing said cathode electrode and said conductive film with a common potential, said dielectric film having a thickness providing a capacity in the order of 300,000 $\mu\mu$farads between said photosensitive mosaic and said conductive film.

ALBERT ROSE.

REFERENCES CITED

The following references are of record in the file of this patent:

UNITED STATES PATENTS

| Number | Name | Date |
|---|---|---|
| 2,213,174 | Rose | Aug. 27, 1940 |